United States Patent
Wookey et al.

(10) Patent No.: US 10,740,038 B2
(45) Date of Patent: Aug. 11, 2020

(54) VIRTUAL APPLICATION DELIVERY USING SYNTHETIC BLOCK DEVICES

(71) Applicant: VMware, Inc., Palo Alto, CA (US)

(72) Inventors: Michael John Wookey, Sydney (AU); Paul Adam Ryman, Sydney (AU); Maria Matelle Tarroza, Sydney (AU); Mallikharjuna Reddy Deva, Sydney (AU); Stephen Jonathan Parry-Barwick, Sydney (AU)

(73) Assignee: VMWARE, INC., Palo Alto, CA (US)

( * ) Notice: Subject to any disclaimer, the term of this patent is extended or adjusted under 35 U.S.C. 154(b) by 1 day.

(21) Appl. No.: 16/105,650

(22) Filed: Aug. 20, 2018

(65) Prior Publication Data
US 2019/0056890 A1 Feb. 21, 2019

Related U.S. Application Data

(60) Provisional application No. 62/548,202, filed on Aug. 21, 2017.

(51) Int. Cl.
G06F 3/06 (2006.01)
G06F 9/455 (2018.01)
G06F 16/188 (2019.01)

(52) U.S. Cl.
CPC .......... *G06F 3/0662* (2013.01); *G06F 3/0604* (2013.01); *G06F 3/0611* (2013.01);
(Continued)

(58) Field of Classification Search
CPC .... G06F 3/0622; G06F 3/0604; G06F 3/0674; G06F 16/188; G06F 3/0662;
(Continued)

(56) References Cited

U.S. PATENT DOCUMENTS

| | | | |
|---|---|---|---|
| 8,266,628 B2* | 9/2012 | Chen | G06F 9/45554 718/1 |
| 8,635,429 B1* | 1/2014 | Naftel | G06F 11/1446 711/206 |

(Continued)

OTHER PUBLICATIONS

Hogan, Cormac. "VSphere 5.0 Storage Features Part 7—VMFS-5 & GPT." Blogs.vmware.com. Nov. 4, 2011. Sep. 20, 2019 <https://web.archive.org/web/20111104151806/https://blogs.vmware.com/vsphere/2011/08/vsphere-50-storage-features-part-7-gpt.html>. (Year: 2011).*

(Continued)

*Primary Examiner* — Yaima Rigol
(74) *Attorney, Agent, or Firm* — Patterson & Sheridan, LLP

(57) ABSTRACT

Embodiments described herein are related to performing virtual application delivery. In some embodiments, a method includes accessing, at a computing device, a datastore comprising a first virtual disk file mapped to a plurality of virtual disk files separate from the first virtual disk file, wherein each of the plurality of virtual disk files comprises at least one application stored thereon. The method further includes receiving, at the computing device, one or more operations for accessing the first virtual disk file, the one or more operations corresponding to a first application stored on a second virtual disk file of the plurality of virtual disk files. The method further includes redirecting the one or more operations for accessing the first virtual disk file to the second virtual disk file.

17 Claims, 3 Drawing Sheets

(52) U.S. Cl.
CPC .......... *G06F 3/0659* (2013.01); *G06F 3/0674* (2013.01); *G06F 3/0683* (2013.01); *G06F 9/45558* (2013.01); *G06F 16/188* (2019.01); *G06F 2009/45579* (2013.01)

(58) Field of Classification Search
CPC .... G06F 3/0611; G06F 3/0659; G06F 3/0683; G06F 9/45558; G06F 2009/45579
See application file for complete search history.

(56) References Cited

U.S. PATENT DOCUMENTS

| | | | | |
|---|---|---|---|---|
| 9,244,969 | B1* | 1/2016 | Love | G06F 16/24 |
| 9,367,244 | B2* | 6/2016 | Kulkarni | G06F 3/065 |
| 9,582,444 | B1 | 2/2017 | Kumar et al. | |
| 2012/0278799 | A1* | 11/2012 | Starks | G06F 9/455 718/1 |
| 2014/0006731 | A1 | 1/2014 | Uluski et al. | |
| 2014/0351815 | A1* | 11/2014 | Conover | G06F 9/45558 718/1 |
| 2016/0098288 | A1* | 4/2016 | Petrov | G06F 9/45558 718/1 |

OTHER PUBLICATIONS

Garfinkel, Tal. "Paradigms for Virtualization Based Host Security" <https://stacks.stanford.edu/file/druid:yp464xx6754/thesis-augmented.pdf>. PDF, (Year: 2010).*

Vmware Inc.: "VMware ESX Server. Using Raw Device Mapping. Technincal Note", Jun. 2, 2009,XP055526340, Retrieved from the Internet:URL:http://web.archive.org/web/20051215071755if /http://www.vmware.com:80/pdf/esx25rawdevicemapping.pdf—[retrieved on Nov. 23, 2018].

Vmware Inc.: "Virtual Disk Format 5.0.Technical Note", Nov. 1, 2012, XP055526341, Retrieved from the Internet: URL:http://web.archive.org/web/20180616084403if /https://www.vmware.com/support/developer/vddk/vmdk 50 technote.pdf [retrieved on Nov. 23, 2018].

Peter Von Oven: "Learning Vmware App Volumes" In: "Learning Vmware App Volumes", Mar. 30, 2016, Packt Publishing Ltd, ProQuest Ebook Central, XP055526542, ISBN: 978-1-78588-912-7.

International Search Reported dated Nov. 26, 2018 for International Application No. PCT/US2018/047348, filed Aug. 21, 2018.

* cited by examiner

VIRTUAL APPLICATION DELIVERY USING SYNTHETIC BLOCK DEVICES

CROSS-REFERENCE TO RELATED APPLICATIONS

This application claims the benefit of U.S. Provisional Patent No. 62/548,202, filed Aug. 21, 2017. The content of the provisional application is hereby incorporated by reference in its entirety.

BACKGROUND

In a traditional application delivery model, applications are provisioned on a computing device (e.g., physical computing device, such as a server, workstation, etc., or a virtual computing instance, such as a virtual machine, container, etc.) in a one-to-one manner, where for each individual computing device a separate copy of each application is installed on physical disks of the computing device. In a data center (e.g., in an enterprise) with many computing devices, an administrator of the data center may therefore need to install, update, or delete applications on computing devices individually, which may be a complex process that is time consuming.

Virtual application delivery systems can help alleviate some of the issues presented by the traditional application model, such as by allowing a single copy of an application to be used by many different computing devices (e.g., physical computing device or virtual computing instance). One type of virtual application delivery system involves applications stored in (e.g., installed on) shared read-only virtual disks (e.g., or another appropriate read-only container). One example of such a virtual application delivery system is App Volumes made commercially available from VMware, Inc. These shared virtual disks may be placed in a datastore accessible over a network by the computing devices or locally stored at a computing device. The computing devices may be configured by a server running a manager that mounts the virtual disks as read-only disks on the computing devices, including the stored applications, and the computing device can then access (e.g., run) the stored applications. The computing devices may further be configured with an agent, which may run as a service on the computing device and use drivers (e.g., filter drivers) to handle application calls and file-system redirects to the virtual disks for the applications. Accordingly, the stored applications are virtually delivered to the computing devices instead of being individually installed locally at each computing device.

Using such a virtual application delivery system, instead of having to individually install, update, or delete applications on each computing device, a virtual disk itself may be configured, such as by an administrator, and a single instance of the application can be installed, updated, or deleted on the virtual disk. Since each computing device uses the same instance installed on the virtual disk, the application may then be automatically installed, updated, or deleted at each computing device. For example, each time a computing device is booted or loaded, it may mount the virtual disk and any updates to the virtual disk including the applications stored on the virtual disk are then automatically applied at the computing device.

One limitation of such virtual application delivery systems, however, is the mounting procedure required at each computing device for each virtual disk with applications installed. In particular, mounting virtual disks may take time during boot of the computing device due to entitlements, loading information into memory, file system integration, etc., and therefore can increase login/loading time of the computing device. To alleviate some of the latency issues with mounting several virtual disks each for different applications, system administrators have typically included many applications on a single virtual disk which has one partition, and only one or a few such virtual disks then need to be mounted in order to access the applications. Though this decreases latency of mounting many virtual disks, if any single application needs to be installed, updated, or deleted that is stored on the virtual disk, the entire virtual disk including the single volume, including all the applications stored thereon, may need to be unmounted first at each separate computing device, modified, and then remounted to each computing device. Unmounting the virtual disk may require complex processes of waiting for or forcing users to logoff a session on a computing device. In another example, separate bundles containing updated applications could be created which would be used next time the user creates a new session on the computing device, though this requires storage for the new bundles and more complexity. Remounting virtual disks on a large number of computing devices is resource intensive. Further, there may be limits on the number of virtual disks that can be mounted at a computing device (e.g., 60 virtual disks per virtual computing instance).

DETAILED DESCRIPTION

Figure 1:
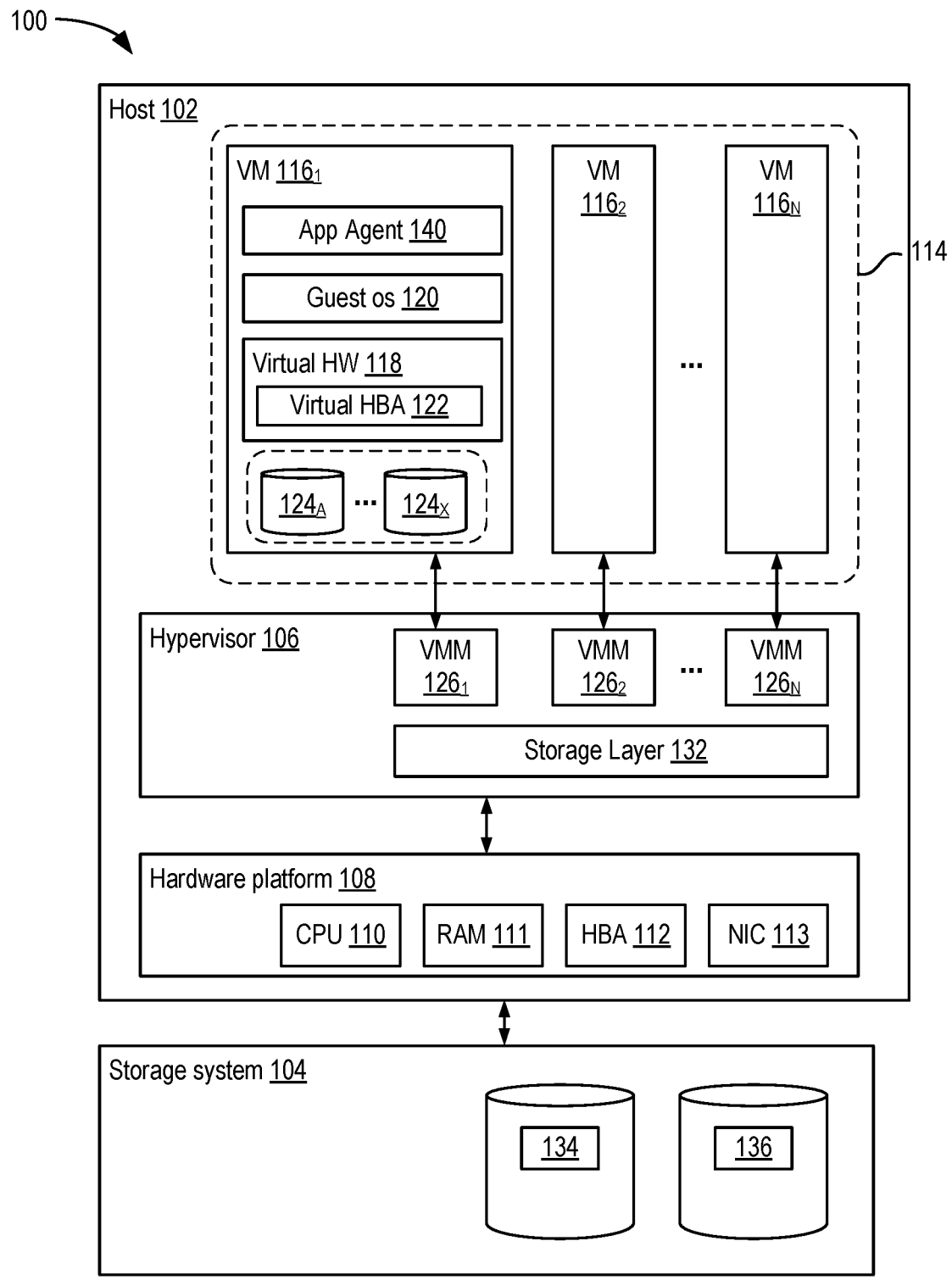
FIG. 1 is a block diagram that illustrates a computer system in which one or more embodiments may be utilized.

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106, that enables sharing of the hardware resources of host 102 by VMs 116. One example of hypervisor 106 is a VMware ESXi hypervisor provided as part of the VMware vSphere solution made commercially available from VMware, Inc. Though certain embodiments are described herein with respect to providing virtual application delivery to virtual machines, it should be noted that similar techniques may be used to provide virtual application delivery to other types of virtual computing instances or even physical computing devices. A user may access a VM 116 directly via the host 102, or may use remote services (e.g., remote desktop services) to access the VM 116 or applications running on the host 102 (e.g., the host 102 is configured as a remote desktop service host) over a network.

Host 102 may comprise a general purpose computer system having one or more virtual machines accessing data stored on a storage system 104 communicatively connected (e.g., via a network interface card (NIC) 113) to host 102. Host 102 may be constructed on a conventional, typically server-class, hardware platform 108. Hardware platform 108 of host 102 may include conventional physical components of a computing device, such as a processor (CPU) 110, a memory 111, a disk interface 112, and NIC 113. Processor 110 is configured to execute instructions, for example, executable instructions that perform one or more operations described herein and may be stored in memory 111. Memory 111 and storage system 104 are devices allowing information, such as executable instructions, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Storage system 104 may be accessible by multiple hosts 102 via a network. Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC).

In some embodiments, storage system 104 may be implemented as software-defined storage such as VMware Virtual SAN made commercially available from VMware, Inc. that clusters together server-attached hard disks and/or solid state drives (HDDs and/or SSDs), to create a flash-optimized, highly resilient shared datastore designed for virtual environments.

While storage system 104 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state disks, or "SSDs." In some embodiments, storage system 104 may be comprised of high-density non-volatile memory. Furthermore, while storage system 104 is depicted as a separate, external component to host 102, storage system 104 may be internal to host 102, for example, a local storage device or locally attached storage.

As shown in FIG. 1, a hypervisor 106 is installed on top of hardware platform 108 and supports a virtual machine execution space 114 within which multiple virtual machines (VMs) 116$_1$-116$_N$ may be instantiated and executed. Each such virtual machine 116$_1$-116$_N$ implements a virtual hardware platform 118 that supports the installation of a guest operating system (OS) 120 which is capable of executing one or more applications, including App Agent 140, which may be installed on the guest OS 120. Examples of a guest OS 120 include any of the well-known commodity operating systems, such as Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks 124$_A$-124$_X$) to enable execution of guest OS 120 transparent to the virtualization of the system hardware. A virtual disk 124 exposes the same abstraction as a real (physical) disk, that is, a linear list of sectors; however, a virtual machine monitor (VMM) may choose to implement virtual disks 124 as regular files on the host. Although, from the perspective of guest operating systems 120, file system calls initiated by such guest operating systems 120 to implement file system-related data transfer and control operations appear to be routed to virtual disks 124$_A$-124$_X$ for final execution, in reality, such calls are processed and passed through virtual HBA 122 to adjunct VMM layers 126$_1$-126$_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104.

Hypervisor 106 includes a storage layer 132 configured to manage storage space persistently for VMs 116 via VMM layers 126$_1$ to 126$_N$. In one embodiment, storage layer 132 may include numerous logical layers, such as an I/O virtualization layer, a file system driver, and a disk access layer. In some embodiments, the I/O virtualization layer receives a data transfer and control operation (in the form of I/O commands, for example, intended for a virtual disk) from VMM layers 126$_1$ to 126$_N$, and converts the operations into file system operations that are understood by a virtual machine file system (VMFS) driver in order to access a file stored in underlying storage under the management of the VMFS driver that represents virtual disk 124. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage system 104. The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

Storage system 104 may store virtual disk files (e.g., .vmdk, .VHD, .HDD, .VDI, etc.) including virtual disk files 134 and 136. It should be noted that though two virtual disk files 134 and 136 are shown stored on storage system 104, storage system 104 may store any number of virtual disk files. VM 116$_1$ in conjunction with hypervisor 106 may be configured to mount one or both of the virtual disk files 134 and 136 as virtual disks 124$_A$ and/or 124$_X$ accessible by VM 116$_1$.

In some embodiments, one of the virtual disk files, such as virtual disk file 134, may store one or more applications in a single partition of the virtual disk file 134 representing a single volume as part of a virtual application delivery system. App Agent 140 running on VM 116$_1$ may be configured to run as a service on the VM 116$_1$ and use drivers (e.g., filter drivers) to handle application calls to the applications stored on virtual disk file 134 and to handle file-system redirects to virtual disk file 134.

For example, in order to mount virtual disk file 134 as a virtual disk 124$_A$, such as at logon time of the VM 116$_1$ the App Agent 140 may communicate with an App Management Server (not shown) coupled to the storage system 104 to determine which applications (e.g., virtual disk files storing applications) are assigned to the VM 116$_1$ (or to a user account accessing the VM 116$_1$), meaning the VM 116$_1$ has access rights to. The App Management Server may then direct the hypervisor 106 (e.g., directly or through another server) to mount the assigned virtual disk file 134 storing applications as virtual disk 124$_A$ in VM 116$_1$. App Agent 140 then uses information on the virtual disk 124$_A$, such as configuration information for the applications, middleware, and/or data files to make the applications stored on virtual disk 124$_A$ available to VM 116$_1$, including redirecting calls to the applications to virtual disk 124$_A$. The virtual disk 124$_A$ representing virtual disk file 134 may be mounted as a single read-only volume on VM 116$_1$ since virtual disk file 134 may be mounted by multiple computing devices to avoid write conflicts between multiple computing devices. Accordingly, in some embodiments, App Agent 140 may be configured to redirect writes associated with applications stored on virtual disk 124$_A$ to another virtual disk or volume of the VM 116$_1$.

Mounting each virtual disk file at VM 116$_1$ to allow VM 116$_1$ to access applications stored on each virtual disk file may be time consuming as discussed, and further, the App Management Server may handle requests for multiple computing devices and therefore need to handle a large number of mounting operations, which can increase latency for logon at VM 116$_1$. For example, the increase in latency may be due to an increased load on hypervisor 106 to mount virtual disks, as the mounting operations for virtual disks for different VMs may become queued. Accordingly, certain embodiments herein provide techniques for using a virtual disk file (e.g., one or a small number of virtual disk files) composed of multiple virtual disk files each storing one or more applications thereon in order to quickly access applications stored on the multiple virtual disk files.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

Figure 2:
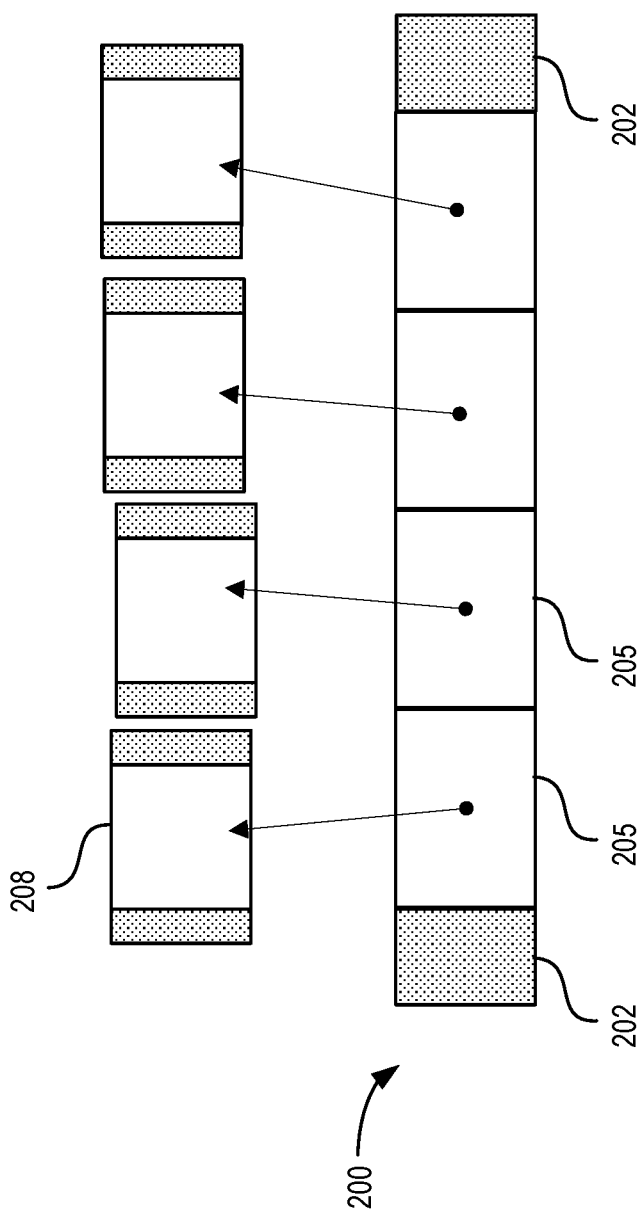
FIG. 2 is a block diagram depicting a single virtual disk file composed of multiple virtual disk file, according to one embodiment of the present disclosure.

FIG. 2 is a block diagram depicting a single virtual disk file composed of multiple virtual disk files, according to one embodiment of the present disclosure.

As shown virtual disk file 200 includes a plurality of partitions 205. The virtual disk file 200 may further include a partition table 202 (e.g., globally unique identifiers (GUID) partition table (GPT)). For example, in certain embodiments, GPT disk partitioning (e.g., of a virtual disk file 200) may be used to partition a disk into a large number of partitions (e.g., up to 128) as compared to some other partitioning schemes which may not enable a sufficient partition count. For example, GPT allocates 64 bits for storing logical block addresses, therefore allowing a maximum disk size of $2^{64}$ sectors, and enabling up to 128 partitions. This is in contrast to master boot record (MBR) partition tables, which use 32 bits for storing logical block addresses, and therefore enable only 4 partitions (or up to 16 with extended partitioning).

The partition table 202 may include a header and a plurality of entries. The header may indicate, for example, usable blocks of the virtual disk file 200 and the number and size of partition entries in the partition table 202. Each of the partition entries includes information describing one of the partitions 205 such as a partition type, an identifier (e.g., GUID) of the partition, a first logical block address (LBA) of the partition, a last LBA of the partition, etc.

In certain embodiments, each partition 205 may be formatted with only one application stored directly thereon (not shown). In some embodiments, each partition 205 may be formatted with one or more applications stored directly thereon (not shown). In some embodiments, some partitions 205 may be empty. Therefore, the virtual disk file 200 can include multiple applications on separate partitions 205 and the single virtual disk file 200 can be mounted at VM 116$_1$ to configure VM 116$_1$ with access to the multiple applications, instead of multiple separate virtual disk files being mounted for accessing multiple applications. For example, each partition 205 may be mounted at VM 116$_1$ as a separate volume of a single virtual disk 124$_A$. Mounting a single or a few such virtual disk files 200, as discussed, can beneficially reduce latency at logon.

In certain embodiments, different VMs (e.g., based on a user of the VM having certain access rights) may have access rights to different applications stored on virtual disk file 200 (e.g., according to configurations defined by an App Management Server). For example, different VMs may have access rights to applications on some partitions 205 and not applications on other partitions 205. Therefore, App Agent 140 (e.g., at the direction of App Management Server) at a VM may be configured to cloak applications by hiding (e.g., by not redirecting application calls) or directing hypervisor 106 to not mount or unmount (e.g., using in-guest or out-of-band unmounting) one or more partitions 205 at the VM for partitions 205 including applications that the VM does not have access rights for. It should be noted that cloaking can be achieved using a number of, or even combination of, methods including simply skipping partitions and unmounting (e.g., using in-guest or out-of-band unmounting). Accordingly, a single virtual disk file 200 with many applications stored thereon can be used for many VMs, even if a given VM only has access rights to a subset of the stored applications by easily cloaking the applications the VM does not have access rights to.

However, storing applications directly on each partition 205 of virtual disk file 200 may have certain disadvantages. For example, the entire virtual disk file 200 is a monolithic virtual disk file with all of the stored applications thereon. Therefore, if any single application needs to be installed, updated, or deleted with respect to the virtual disk file 200, the entire virtual disk file, including all the applications stored thereon, may need to be unmounted first at each separate VM, the corresponding partition 205 modified (which may be quicker than modifying an entire virtual disk file 200), and then remounted at each VM.

Accordingly, in certain embodiments, instead of applications being stored directly on each partition 205, each partition 205 may instead point or map to another separate virtual disk file 208 from the virtual disk file 200. In some embodiments, some partitions 205 may be empty and may not point or map to a virtual disk file 208. Each of the virtual disk files 208 may directly store one or more applications, instead of virtual disk file 200. Accordingly, virtual disk file 200 may be a synthetic block device, in that it does not directly store blocks of data corresponding to file objects, but instead points to other block devices (e.g., virtual disk files 208) that store blocks of data corresponding to file objects. Accordingly, the file objects stored on each virtual disk file 208 of which virtual disk file 200 is composed appear as regular files of virtual disk file 200.

Accordingly, in certain embodiments, the virtual disk file 200 provides a new virtual disk type (e.g., vmdk disk type) that is capable of mapping each of its partitions 205 to other virtual disk files 208 (e.g., vmdk files). Such a virtual disk type may be referred to as a composable disk. This may be analogous to the use of symbolic links on Linux, except that I/O operations to virtual disk file 200 are redirected at the block level aligned on partition boundaries to virtual disk files 208, as discussed further herein. This is further similar in concept to Raw Device Mapping (RDM) features of VMFS which redirects I/O operations via a vmdk descriptor file of a virtual disk to physical block storage devices or LUNs. Accordingly, in certain embodiments, virtual disk file 200 is a vmdk descriptor file composed of links to other vmdk files, and accordingly I/O operations to virtual disk file 200 are redirected to the other vmdk files, such as virtual disk files 208, on a one-to-many basis. This can provide an additional layer of virtualization over traditional virtual disks that include applications directly.

Generally, the vmdk descriptor file format can be extended to support new kinds of disks through a createType parameter of the vmdk descriptor file. For example, the createType parameter may typically take such values as monolithicFlat, vmfsSparse, and vmfsRDM, to refer to different corresponding disk types. The vmdk descriptor file format further includes extent descriptors that are extensible to support different types of extents including FLAT, SPARSE, and VMFSRDM. An extent is a region of storage of the virtual disk, such as corresponding to a partition. Accordingly, the different extent types can refer to different types of partitions.

Certain embodiments, therefore, provide one or more new createType values to refer to composable disks. For example, vmfsMBRComposed is a new createType value for MBR based composable disks, and vmfsGPTComposed is a new createType value for GPT based composable disks. The vmdk descriptor file of a composable disk, therefore, can include a createType value set to vmfsGPTComposed, for example. Certain embodiments further provide a new extent type to indicate that a certain region of storage or partition is a link to another vmdk file. For example, VMDKREDIRECT is a new extent type. The vmdk descriptor file of a composable disk, therefore, can include an extent files value of [VMDKREDIRECT "X.vmdk"], where X.vmdk is the name of the vmdk file the partition is mapped to. Certain embodiments further provide a null redirection option for indicating empty partitions of a composable disk. Such an empty partition can be indicated as having an extent file value of [VMDKREDIRECT] without a vmdk file name specified.

In certain embodiments, unlike for other vmdk disk types which just map content in response to I/O operations made from a guest OS, the virtual storage system for a composed disk also synthesizes the partition table blocks in the disk header and footer.

As discussed, in certain embodiments, input/output (I/O) operations of a VM to virtual disk file 200 may be redirected at the block level to the virtual disk files 208 in order to access applications stored on the virtual disk files 208. For example, hypervisor 106 redirects I/O operations to blocks on virtual disk file 200 to blocks on virtual disk files 208 based on the mappings indicated in virtual disk file 200. In certain embodiments, virtual disk file 200 includes information that maps a partition in virtual disk file 200 to a corresponding partition in a corresponding virtual disk file 208. Accordingly, hypervisor 106 may redirect an I/O operation from a partition in virtual disk file 200 to a partition in a virtual disk file 208 at the block level. In certain embodiments, the mapping includes an offset (e.g., number of blocks) to apply to the block indicated by the I/O operation when accessing the virtual disk file 208.

By having virtual disk file 200 point to other virtual disk files 208 storing applications instead of storing applications itself, complexity for managing the virtual disk file 200 is reduced. For example, if an application needs to be added to a VM while the virtual disk file 200 is mounted, the application can be added even while the virtual disk file 200 is in use by the VM. For example, a new virtual disk file 208 can be created with the application stored while the virtual disk file 200 is still in use. A partition 205 of the virtual disk file 200 that does not point to a virtual disk file 208 can be modified to point to the new virtual disk file 208 with the application installed. For example, a new extent link can be dynamically created in virtual disk file 200. The App Agent 140 (e.g., at the direction of the App Management Server) of each VM that has access rights to the new application can then uncloak (e.g., unhide) the partition that points to the new virtual disk file 208 and the VM can access the application stored thereon. Hiding and not hiding a partition may refer to the App Agent 140 either not redirecting or redirecting, respectively, application calls to virtual disk file 200 for the applications stored on the corresponding virtual disk file 208 associated with the partition.

Similarly, if an application needs to be updated at a VM that is stored in a virtual disk file 208, a new virtual disk file 208 can be created with an updated version of the application stored while the virtual disk file 200 is still in use. For example, an update to the application can be captured in a cloned copy of the virtual disk file 208 with an incremented version number. A partition 205 of the virtual disk file 200 that does not point to a virtual disk file 208 can be modified to point to the new virtual disk file 208 with the updated version of the application installed. For example, a new read-only extent link can be dynamically created in virtual disk file 200. The App Agent 140 (e.g., at the direction of the App Management Server) of each VM that has access rights to the updated version of the application can then cloak (e.g., hide) the partition that points to the old virtual disk file 208 with the old version of the application and uncloak (e.g., unhide) the partition that points to the new virtual disk file 208 and the VM can access the updated version of the application stored thereon. Accordingly, the application can be updated while the virtual disk file 200 is still mounted by VMs. When an application is updated as described may vary. In certain embodiments, App Agent 140 waits until the application is closed (e.g., by a user) on the VM. For example, for non-critical application updates, App Agent 140 may wait for the application to be closed by the user. In certain embodiments, App Agent 140 may force the VM to close the application before performing the update. For example, for critical updates (e.g., to fix security vulnerabilities), App Agent 140 may force close the application and perform the update.

In addition, if an application needs to be deleted at a VM that is stored in a virtual disk file 208, the App Agent 140 at the VM with the virtual disk file 200 mounted may cloak (e.g., hide) the partition that points to the virtual disk file 208. Accordingly, the application can be deleted while the virtual disk file 200 is still mounted by VM. When an application is deleted as described may vary. In certain embodiments, App Agent 140 waits until the application is closed (e.g., by a user) on the VM. For example, for non-critical applications, App Agent 140 may wait for the application to be closed by the user. In certain embodiments, App Agent 140 may force the VM to close the application before performing the delete. For example, for critical applications (e.g., to fix security vulnerabilities), App Agent 140 may force close the application and perform the deletion.

Links to unused virtual disk files 208 in virtual disk file 200 may be removed, such as during maintenance periods. For example, extent links to the unused virtual disk files 208 may be deleted from virtual disk file 200.

In certain embodiments, a master VM may be created from which other VMs are cloned when a new VM is needed for use. For example, a master VM may be generated on a host with the virtual disk file 200 mounted so that the master VM has access to applications stored on the virtual disk files 208 that virtual disk file 200 points to. New VMs may be generated as clones of the master VM on the same and/or different hosts that then also have access to the applications. Such cloning can be used to quickly and easily deploy numerous VMs configured with the applications.

Different cloning procedures may be used to clone a VM, such as a full clone procedure where a copy of an image of a master VM (e.g., a copy of the data files in a virtual storage (e.g., virtual disks) of the master VM) is created for each cloned VM (e.g., on the physical storage of a host of the cloned VM) in order to create the cloned VM. This can be time consuming and resource intensive as there is a large amount of information to copy in physical storage for each full clone operation. In another cloning procedure, a link clone may be generated where instead of copying an image of the master VM, each cloned VM points to the image of the master VM for performing read operations, and a separate delta disk (e.g., virtual disk) is generated for each cloned VM to write any write operations to. Since information is not copied, less time and resources are consumed for cloning the VM. However, to perform the clone, the master VM still needs to be turned off to generate an image of the master VM and the delta disks. Accordingly, the cloned VM still needs to be powered on and go through procedures for mounting virtual disk files, and other boot procedures.

Accordingly, in some embodiments, an instant clone process (e.g., implementing VMware Instant Clone Technology provided as part of the VMware Horizon solution made commercially available from VMware, Inc.) is used to clone a master VM. In the instant clone process, even while the master VM is running, an image of the master VM is created that includes both a copy of the virtual storage of the master VM as well as the current virtual volatile memory of the master VM. Accordingly, the instant clone image is an image of the current operating state of the master VM. In certain embodiments, the instant clone image of the master VM may be generated after virtual disk file 200 is mounted. Accordingly, when a cloned VM is generated, it may directly load into a running state with virtual disk file 200 mounted, and therefore latency for mounting the virtual disk file 200 may be avoided. In addition, the App Agent 140 on the clone can still enforce access rights to applications for the cloned VM that are different than for the master VM by cloaking or uncloaking partitions 205 of virtual disk file 200 as discussed.

Figure 3:
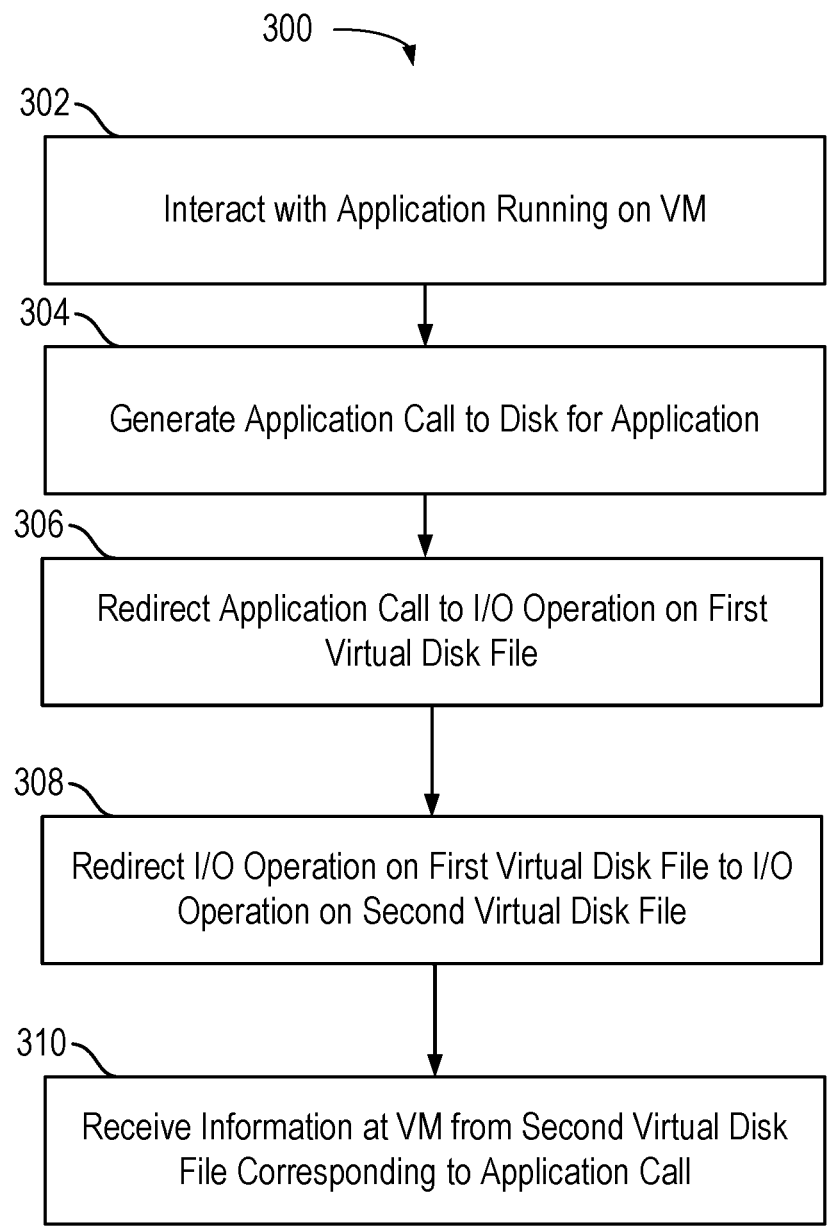
FIG. 3 is a flow diagram illustrating a method for performing virtual application delivery, according to embodiments of the present disclosure.

FIG. 3 is a flow diagram illustrating a method 300 for performing virtual application delivery. While method 300 is described in conjunction with the systems shown in FIGS. 1 and 2, it should be recognized that other systems may be used to perform the described methods.

Method 300 begins at step 302, where a user interacts with an application running on the VM $116_1$. At step 304, the VM $116_1$ generates application calls to disk based on the user interacting with the application. At step 306, the App Agent 140 on the VM $116_1$ redirects the application calls to virtual disk file 200 as corresponding I/O operations for accessing virtual disk file 200. At step 308, the hypervisor 106 on the VM $116_1$ redirects the I/O operations for accessing virtual disk file 200 to a virtual disk file 208. For example, the I/O operations for accessing the virtual disk file 200 may be directed to a certain partition 205 of the virtual disk file 200 associated with the application. The virtual disk file 200 may include information mapping the partition 205 of the virtual disk file 200 to a corresponding partition in virtual disk file 208 where the application is actually stored. At step 308, the VM $116_1$ receiving information from the virtual disk file 208 corresponding to the application calls for the application stored on the virtual disk file 208. Accordingly, VM $116_1$ can access the application.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for performing virtual application delivery, comprising:
    accessing, at a computing device, a datastore comprising a first virtual disk file, wherein each respective partition of a plurality of partitions of the first virtual disk file is mapped to a respective virtual disk file of a plurality of virtual disk files separate from the first virtual disk file, wherein each of the plurality of virtual disk files comprises at least one application stored thereon;
    receiving, at the computing device, one or more operations for accessing a given partition of the first virtual disk file, the one or more operations corresponding to a first application stored on a second virtual disk file of the plurality of virtual disk files; and
    redirecting, based on the given partition, the one or more operations for accessing the first virtual disk file to the second virtual disk file.

2. The method of claim 1, wherein blocks of the given partition of the first virtual disk file are mapped to blocks of a corresponding partition of the second virtual disk file.

3. The method of claim 1, further comprising selectively hiding, unmounting, or not mounting at least one of the plurality of partitions of the first virtual disk file corresponding to a first application based on access rights to the first application for the computing device.

4. The method of claim 1, further comprising mounting the first virtual disk file as a plurality of volumes at the computing device, each of the plurality of volumes corresponding to one of the plurality of partitions of the first virtual disk file.

5. The method of claim 4, further comprising, while the first virtual disk file is mounted:
    adding a mapping from one of the plurality of partitions of the first virtual disk file that is cloaked to a third virtual disk file separate from the first virtual disk file and the plurality of virtual disk files, the third virtual disk file storing a second application;
    uncloaking the one of the plurality of partitions of the first virtual disk file; and
    running, at the computing device, the second application.

6. The method of claim 5, wherein the second application comprises an updated version of the first application, and further comprising, while the first virtual disk file is mounted:
    cloaking one of the plurality of partitions of the first virtual disk file that is mapped to the second virtual disk file.

7. The method of claim 1, wherein the computing device is a virtual computing instance running on a host machine, and further comprising:
    accessing, by the host machine, a stored image of a memory and a storage of the virtual computing instance in a state with the first virtual disk file mounted at the virtual computing instance; and
    loading the virtual computing instance from the stored image in the state with the first virtual disk file mounted at the virtual computing instance.

8. The method of claim 1, wherein the first virtual disk file comprises a globally unique identifiers (GUID) partition table (GPT).

9. A non-transitory computer-readable storage medium comprising instructions that, when executed in a computing device, perform a method for performing virtual application delivery, the method comprising:

accessing, at a computing device, a datastore comprising a first virtual disk file, wherein each respective partition of a plurality of partitions of the first virtual disk file is mapped to a respective virtual disk file of a plurality of virtual disk files separate from the first virtual disk file, wherein each of the plurality of virtual disk files comprises at least one application stored thereon;

receiving, at the computing device, one or more operations for accessing a given partition of the first virtual disk file, the one or more operations corresponding to a first application stored on a second virtual disk file of the plurality of virtual disk files; and redirecting, based on the given partition, the one or more operations for accessing the first virtual disk file to the second virtual disk file.

10. The non-transitory computer-readable storage medium of claim 9, wherein blocks of the given partition of the first virtual disk file are mapped to blocks of a corresponding partition of the second virtual disk file.

11. The non-transitory computer-readable storage medium of claim 9, wherein the method further comprises selectively hiding, unmounting, or not mounting at least one of the plurality of partitions of the first virtual disk file corresponding to a first application based on access rights to the first application for the computing device.

12. The non-transitory computer-readable storage medium of claim 9, wherein the method further comprises mounting the first virtual disk file as a plurality of volumes at the computing device, each of the plurality of volumes corresponding to one of the plurality of partitions of the first virtual disk file.

13. The non-transitory computer-readable storage medium of claim 12, wherein the method further comprises, while the first virtual disk file is mounted:

adding a mapping from one of the plurality of partitions of the first virtual disk file that is cloaked to a third virtual disk file separate from the first virtual disk file and the plurality of virtual disk files, the third virtual disk file storing a second application;

uncloaking the one of the plurality of partitions of the first virtual disk file; and running, at the computing device, the second application.

14. The non-transitory computer-readable storage medium of claim 13, wherein the second application comprises an updated version of the first application, and wherein the method further comprises, while the first virtual disk file is mounted:

cloaking one of the plurality of partitions of the first virtual disk file that is mapped to the second virtual disk file.

15. The non-transitory computer-readable storage medium of claim 9, wherein the computing device is a virtual computing instance running on a host machine, and wherein the method further comprises:

accessing, by the host machine, a stored image of a memory and a storage of the virtual computing instance in a state with the first virtual disk file mounted at the virtual computing instance; and loading the virtual computing instance from the stored image in the state with the first virtual disk file mounted at the virtual computing instance.

16. The non-transitory computer-readable storage medium of claim 9, wherein the first virtual disk file comprises a globally unique identifiers (GUID) partition table (GPT).

17. A computer system for performing virtual application delivery, the computer system comprising:

a datastore;

a processor (CPU) configured to perform a method for performing virtual application delivery, the method comprising:

accessing, at a computing device, a datastore comprising a first virtual disk file, wherein each respective partition of a plurality of partitions of the first virtual disk file is mapped to a respective virtual disk file of a plurality of virtual disk files separate from the first virtual disk file, wherein each of the plurality of virtual disk files comprises at least one application stored thereon;

receiving, at the computing device, one or more operations for accessing a given partition of the first virtual disk file, the one or more operations corresponding to a first application stored on a second virtual disk file of the plurality of virtual disk files; and redirecting, based on the given partition, the one or more operations for accessing the first virtual disk file to the second virtual disk file.

* * * * *